(12) United States Patent
Takahashi

(10) Patent No.: US 6,260,195 B1
(45) Date of Patent: Jul. 10, 2001

(54) CABLE TELEVISION SYSTEM AND TERMINAL DEVICE FOR CABLE TELEVISION SYSTEM

(75) Inventor: Yoshiharu Takahashi, Seki (JP)

(73) Assignees: Xing Inc.; Brother Kogyo Kabushiki Kaisha, both of Aichi-ken (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/841,921

(22) Filed: Apr. 8, 1997

(30) Foreign Application Priority Data

Apr. 9, 1996 (JP) .................................. 8-113225

(51) Int. Cl.[7] ........................................ H04N 7/16
(52) U.S. Cl. ........................... 725/136; 725/95; 348/461
(58) Field of Search .......................... 348/6, 7, 10, 11, 348/12, 725, 731–731.13, 461; 455/5.1, 6.1, 4.2, 6.2; 725/37–153; H04N 7/16

(56) References Cited

U.S. PATENT DOCUMENTS

| | | | |
|---|---|---|---|
| 3,975,583 | * 8/1976 | Meadows | 358/86 |
| 3,993,955 | * 11/1976 | Belcher et al. | 348/9 |
| 4,015,074 | * 3/1977 | Inoue | 455/6.3 |
| 4,198,624 | * 4/1980 | Watanabe | 455/6.3 |
| 4,306,309 | * 12/1981 | Yasuda | 455/186.1 |
| 4,656,629 | * 4/1987 | Kondoh et al. | 348/485 |
| 4,695,880 | * 9/1987 | Johnson et al. | 348/6 |
| 4,710,971 | * 12/1987 | Nozaki | 348/10 |
| 4,737,993 | * 4/1988 | DeVilbiss | 348/10 |
| 4,802,022 | * 1/1989 | Harada | 455/6.3 |
| 4,862,268 | * 8/1989 | Campbell et al. | 348/463 |
| 4,888,819 | * 12/1989 | Oda | 348/731 |
| 4,994,909 | * 2/1991 | Graves et al. | 348/7 |
| 5,034,819 | * 7/1991 | Tsukagoshi | 455/186.1 |
| 5,233,423 | * 8/1993 | Jernigan et al. | 358/181 |
| 5,260,778 | * 11/1993 | Kauffman | 466/6.2 |
| 5,317,391 | * 5/1994 | Banker et al. | 348/6 |
| 5,371,550 | * 12/1994 | Shibutani et al. | 348/570 |
| 5,416,508 | * 5/1995 | Sakuma et al. | 348/3 |
| 5,420,923 | * 5/1995 | Beyers et al. | 348/6 |
| 5,430,493 | * 7/1995 | Kim | 348/564 |
| 5,495,283 | * 2/1996 | Cowe | 348/9 |
| 5,635,996 | * 6/1997 | Okamura | 455/185.1 |
| 5,659,350 | * 8/1997 | Hendricks et al. | 348/6 |
| 5,668,805 | * 9/1997 | Yoshinobu | 348/7 |

* cited by examiner

*Primary Examiner*—Andrew Faile
*Assistant Examiner*—Reuben M. Brown
(74) *Attorney, Agent, or Firm*—Pitney, Hardin, Kipp & Szuch LLP

(57) ABSTRACT

Disclosed is a cable television system including a broadcasting center and terminal devices. When a notification data is to be transmitted to each terminal device, the broadcasting center transmits a channel data indicating a channel through which the notification data is transmitted. The terminal device, upon receipt of the channel data, stores the channel data in a memory. When the terminal device is turned OFF, the last viewed channel number is stored in the memory. When, the terminal device is turned ON, if the channel data transmitted from the broadcasting center is stored in the memory, the terminal device is tuned in the channel indicated by the channel data, while if the channel data is not stored in the memory, the terminal device is tuned in the last viewed channel.

22 Claims, 10 Drawing Sheets

CABLE TELEVISION SYSTEM AND TERMINAL DEVICE FOR CABLE TELEVISION SYSTEM

BACKGROUND OF THE INVENTION

The present invention relates to a cable television (hereinafter, referred to as CATV) broadcasting system, and a terminal device for the CATV broadcasting system.

Recently, CATV systems have come into wide use. Users of the CATV systems who contract to receive CATV broadcasts receive a broadcast signal transmitted through a CATV network from a broadcasting center with use of a terminal device. The terminal device includes a converter connected to the CATV network and a TV receiver connected to the converter. The TV receiver reproduces images and sounds based on the broadcast signal. The terminal device is usually arranged such that when the terminal device is turned ON, the channel which was being viewed when the terminal device was turned OFF is automatically selected.

The CATV broadcasting system as described above may also be used to broadcast various notifications such as, for example, notification of temporary interruption of broadcasting due to construction work on the network and the like (hereinafter, referred to as "notification information"). Generally, the notification information is broadcast through a specific channel (hereinafter, referred to as a notification channel). Since the terminal device is arranged to automatically select, when the terminal device is turned ON, the last channel the users viewed, the users may not see the notification information unless they positively select the notification channel. Thus, there is a problem in that the notification information may not be effectively delivered.

To cope with this problem, it is possible to broadcast the notification information through all broadcast channels at once at a predetermined time, however, since a program being viewed by users must be forcibly interrupted to display the notification information, the users may be inconvenienced.

SUMMARY OF THE INVENTION

It is therefore an object of the present invention to provide a terminal device for a CATV broadcasting system, and a CATV broadcasting system capable of efficiently and conveniently transmitting notification information to users.

For the above object, according to the invention, there is provided a television system, comprising: a broadcasting center; and a plurality of terminal devices. The broadcasting center transmits broadcasting signals corresponding to a plurality of television channels, and a channel data signal representative of a channel number. Each of the terminal devices receives the broadcasting signals, and the channel data signal. Further, each of the terminal devices includes a tuner, a memory, in which the channel data is stored, and a controller, the controller controlling the tuner to select a channel represented by the channel data stored in the memory when the terminal device is turned ON.

Optionally, the memory may store a selected channel number which was selected when the terminal device was last turned OFF, and if the channel data does not represent a channel number, the controller controls the tuner to select the selected channel number which had been stored in the memory.

Further optionally, the broadcasting center may transmit a predetermined information, such as a notification information through a channel represented by the channel data. The notification information may be related to operation of the broadcasting center, such as an interruption of broadcasting due to a construction work or the like.

Still optionally, the television may be a cable television system, in which the broadcasting signals and the channel data signal are transmitted from the broadcasting center to the terminal devices through a cable network.

Furthermore, the broadcasting signals are not limited to analog signals, but could be digital signals.

According to another aspect of the invention, there is provided a television system, comprising: a broadcasting center; and a plurality of terminal devices. The broadcasting center transmits broadcasting signals corresponding to a plurality of television channels, and a channel data signal representative of a channel number. Each of the terminal devices receives the broadcasting signals, and the channel data signal. Each of the terminal devices includes an operable member which is operated by a user to turn ON or OFF the terminal device; a tuner; a memory, in which the channel data is stored; and a controller. The controller controls the tuner to select a channel represented by the channel data stored in the memory in response to operation of the operable member. Thus, when the terminal device is turned ON or OFF, the channel represented by the channel data stored in the memory is selected.

Optionally, the television system may be a cable television system using a cable network, the broadcasting signals and the channel data signal being transmitted from the broadcasting center to the terminal devices through the cable network.

According to further aspect of the invention, there is provided a terminal device for a television system, the terminal device receiving signals transmitted from a broadcasting center of the television system. The terminal device may include a signal receiving system, the signal receiving system receives signals transmitted from the broadcasting center, the signals including a channel data signal representative of a channel through which a predetermined information is transmitted; a tuner; a memory, the memory storing the channel data received by the signal receiving system; and a controller, the controller controlling the tuner to select a channel represented by the channel data stored in the memory when the terminal device is turned ON.

Optionally, when the tuner is tuned to the channel represented by the channel data, the channel data may be deleted.

Further optionally, the television system may be a cable television system.

According to furthermore aspect of the invention, there is provided a terminal device for a television system, the terminal device receiving signals transmitted from a broadcasting center of the television system, the terminal device comprising: a signal receiving system, the signal receiving system receives signals transmitted from the broadcasting center, the signals including a channel data signal representative of a channel through which a predetermined information is transmitted; an operable member to be operated to turn ON or OFF the terminal device: a tuner; a memory, the memory storing the channel data received by the signal receiving system; a controller, the controller controlling the tuner to select a channel represented by the channel data stored in the memory in response to operation of the operable member.

When the tuner is tuned in the channel represented by the channel data, the channel data may be deleted.

Further optionally, the television system may be a cable television system.

According to still further aspect of the invention, there is provided a television system, comprising: a broadcasting center; and a plurality of terminal devices, the broadcasting center transmitting broadcasting signals corresponding to a plurality of television channels and a channel data signal representative of a channel number, each of the terminal devices receiving the broadcasting signals and the channel data signal, each of the terminal devices including: a tuner; a memory, the memory storing the channel data and a selected channel number which was selected when the terminal device was last turned OFF; a controller, the controller controlling the tuner to tune in a channel number represented by the channel data stored in the memory for a predetermined period when the terminal device is tuned ON, then tune in the selected channel number.

Optionally, each of the terminal devices further includes a timer, the predetermined period being measured by the timer.

According to further aspect of the invention, there is provided a television system, comprising: a broadcasting center; and a plurality of terminal devices, the broadcasting center transmitting broadcasting signals corresponding to a plurality of television channels and a channel data signal representative of a channel number, each of the terminal devices receiving the broadcasting signals and the channel data signal, each of the terminal devices including: a tuner; a memory, the memory storing the channel data and a selected channel number which was selected when the terminal device was last turned OFF; a controller, the controller controlling the tuner to tune in a channel number represented by the channel data stored in the memory for a predetermined period when an operation for turning OFF the terminal device is executed, then turn OFF the terminal device.

Optionally, each of the terminal devices further includes a timer, the predetermined period being measured by the timer.

According to further aspect of the invention, there is provided a television system, comprising: a broadcasting center; and a plurality of terminal devices, wherein the broadcasting center transmits broadcasting signals corresponding to a plurality of channels, and a channel data signal; wherein each of the plurality of terminal devices has a tuner, a channel data receiver and a controller, the controller controls the tuner to tune in a channel in accordance with the channel data transmitted from the broadcasting center and received by the channel data receiver.

BRIEF DESCRIPTION OF THE ACCOMPANYING DRAWINGS

DESCRIPTION OF THE EMBODIMENTS

An embodiments of the present invention will be described with reference to the accompanying drawings.

Figure 1:
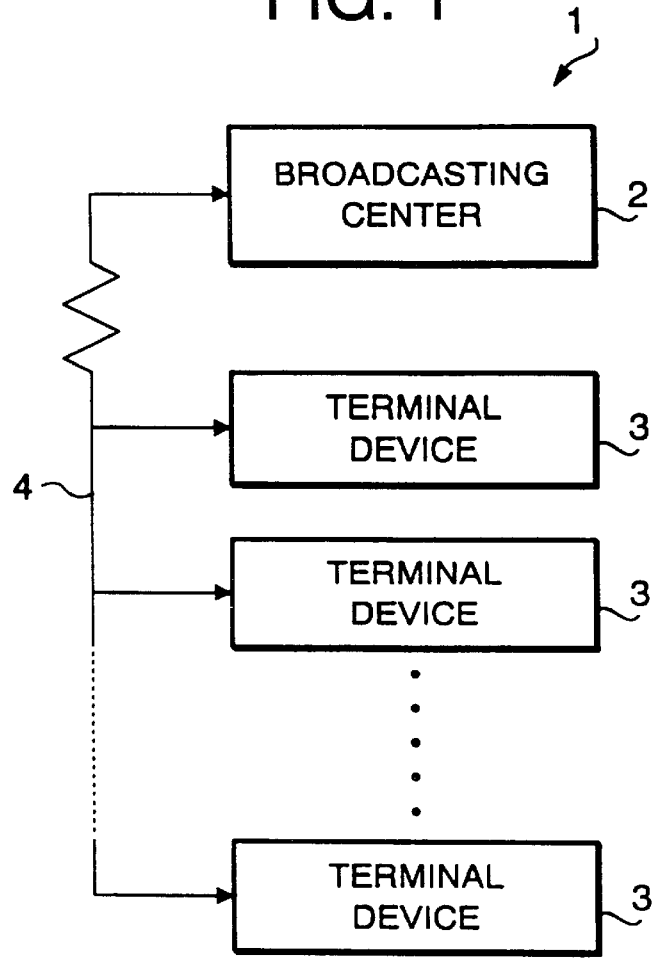
FIG. 1 is a block diagram showing a CATV broadcasting system according to an embodiment of the present invention.

FIG. 1 shows a configuration of a CATV system 1 including a broadcasting center 2, a plurality of terminal devices 3 as a first embodiment of the invention. The terminal devices 3 are connected to the broadcasting center 2 through a cable 4.

Figure 2:
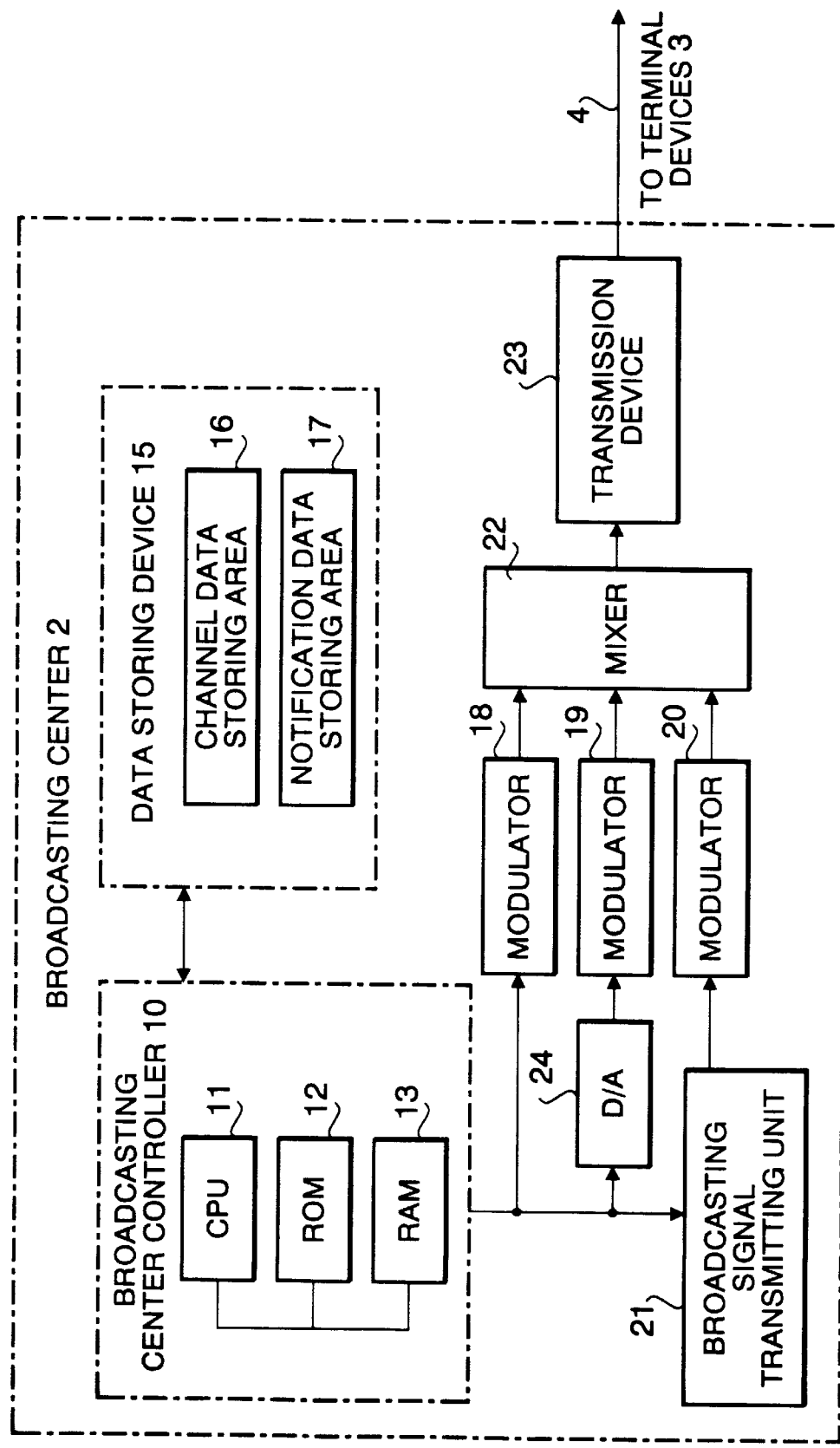
FIG. 2 is a block diagram showing the arrangement of a broadcasting center.

FIG. 2 shows a configuration of the broadcasting center 2. As shown in FIG. 2, the broadcasting center 2 includes a broadcasting center controller 10 which incorporates a CPU (Central Processing Unit) 11, a ROM (Read Only Memory) 12, a RAM (Random Access Memory) 13 and the like to control the broadcasting center 2. A data storing device 15 is connected to the broadcasting center controller 10 which incorporates a channel data storing area 16 and a notification data storing area 17.

The channel data storing area 16 stores a channel data designating a channel (a "notification channel") through which notification data is transmitted to the terminal devices 3.

Figure 3:
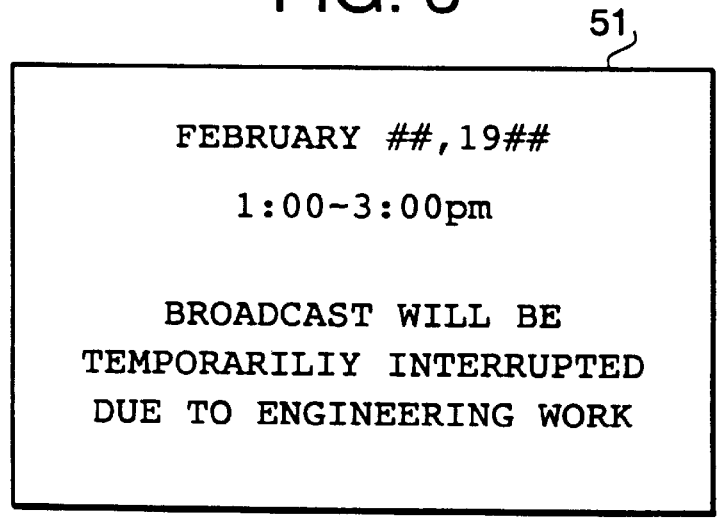
FIG. 3 is an example of notification information transmitted from the broadcasting center.

The notification data storing area 17 stores broadcasting data such as notification information to be broadcast through the notification channel. FIG. 3 shows an example of the notification information. The notification data includes image data, such as characters and the like, and preferably, also includes audio data, regarding, for example, temporary interruption of broadcasting due to engineering work. Note, the image data included in the notification data may be still or moving image data.

A broadcasting signal transmitting unit 21 is also connected to the broadcasting center controller 10. The broadcasting signal transmitting unit 21 is for transmitting the broadcasting signal of ordinary TV programs such as movies, news, sports and the like (hereinafter, referred to as ordinary broadcasting signal). The broadcasting signal transmitting unit 21 may include a reproducing device such as, for example, a video tape reproducing device, a video disk reproducing device and the like for reproducing the broadcasting signal of each channel recorded to a recording medium or a receiving device for receiving a broadcasting signal transmitted from the outside by cable or wirelessly.

The above described notification channel designating data, notification data and ordinary broadcasting signal are modulated by modulators 18, 19 and 20, and then multiplexed by the mixer 22 with being allocated to respective channels. The multiplexed signal is then transmitted to the terminal devices 3 through a transmission device 23 and the cable 4. Note, the notification data is supplied to the modulator 19 after conversion into an analog signal by a D/A converter 24 (note, hereinafter, the notification data converted to an analog signal is referred to as notification data signal).

Figure 4:
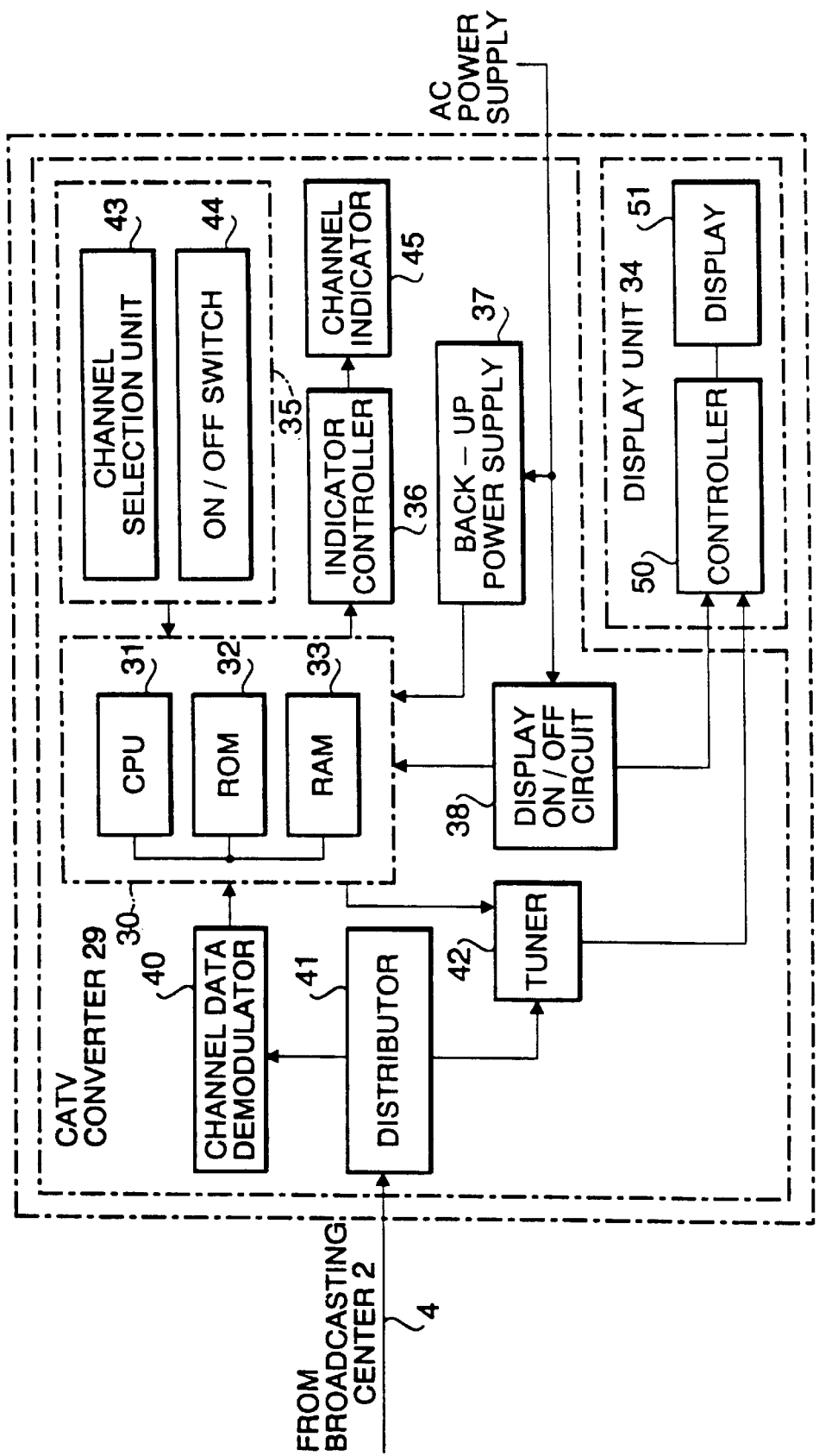
FIG. 4 is a block diagram showing the arrangement of a terminal device according to a first embodiment.

FIG. 4 shows the configuration of the terminal device 3. The terminal device 3 includes a CATV converter 29 and a display unit 34 that are connected with each other.

The display unit 34 is composed of a controller 50 and a display 51, such as a CRT (Cathode Ray Tube), an LCD (Liquid Crystal Display) or the like, connected thereto. Note that a speaker is incorporated in the display 51 to output sounds.

The CATV converter 29 is connected to the cable 4 and includes a terminal device controller 30 incorporating a CPU 31, a ROM 32, a RAM 33 and the like. Connected to the terminal device controller 30 are an operation unit 35, an indicator control unit 36, a back-up power supply circuit 37 for continuously supplying power to the terminal device controller 30 when the terminal device 3 is turned OFF, a receiver ON/OFF circuit 38 and the like.

The operation unit 35 includes a channel selection unit 43 and an ON/OFF switch 44 for turning ON and OFF the terminal device 3. A channel indicator 45 is connected to the indicator control unit 36 and is composed of, for example, a 7-segment LED or the like to display the channel number selected by the channel selection unit 43.

The display ON/OFF circuit 38 turns the terminal device 3 including the display unit 34 ON or OFF based on the operation of the ON/OFF switch 44. An AC 100 V power supply and the controller 50 are connected through the display ON/OFF circuit 38. Note that even if the terminal device 3 is turned OFF, the terminal device controller 30 is energized by the AC 100 V power supply through the back-up power supply circuit 37 so that the terminal device controller 30 can receive data transmitted from the broadcasting center 2 and store the received data in the RAM 33 at all times.

The terminal device controller 30 is connected to the cable 4 through a channel data demodulator 40 and a distributor 41. The distributor 41 is used to separate the multiplexed signal supplied from the broadcasting center 2 into the channel data signal, the notification data signal and the ordinary broadcasting signal.

The separated channel data signal is demodulated through the channel data demodulator 40, and then supplied to the terminal device controller 30.

The notification data signal and the ordinary broadcasting signal are supplied to a tuner 42 connected to the terminal device controller 30. The tuner 42 tunes in a channel from among the notification channel and the ordinary broadcasting channels in response to a command from the terminal device controller 30, demodulates the broadcasting signal of the selected channel and then supplies the demodulated signal to the controller 50. The controller 50 controls the display 51 to output images and sounds in accordance with the broadcasting data signal or the notification data signal.

Specifically, the tuner 42 tunes in a broadcasting signal corresponding to the selected channel number among the signals output from the distributor 41, and converts the tuned broadcasting signal into a signal corresponding to a predetermined TV channel. The display unit 34 is configured to receive the signal corresponding to the predetermined TV channel and outputs an image and sound in accordance with the received signal. Thus, the images and sounds corresponding to the selected channel can be output by the display unit 34.

Figure 5:
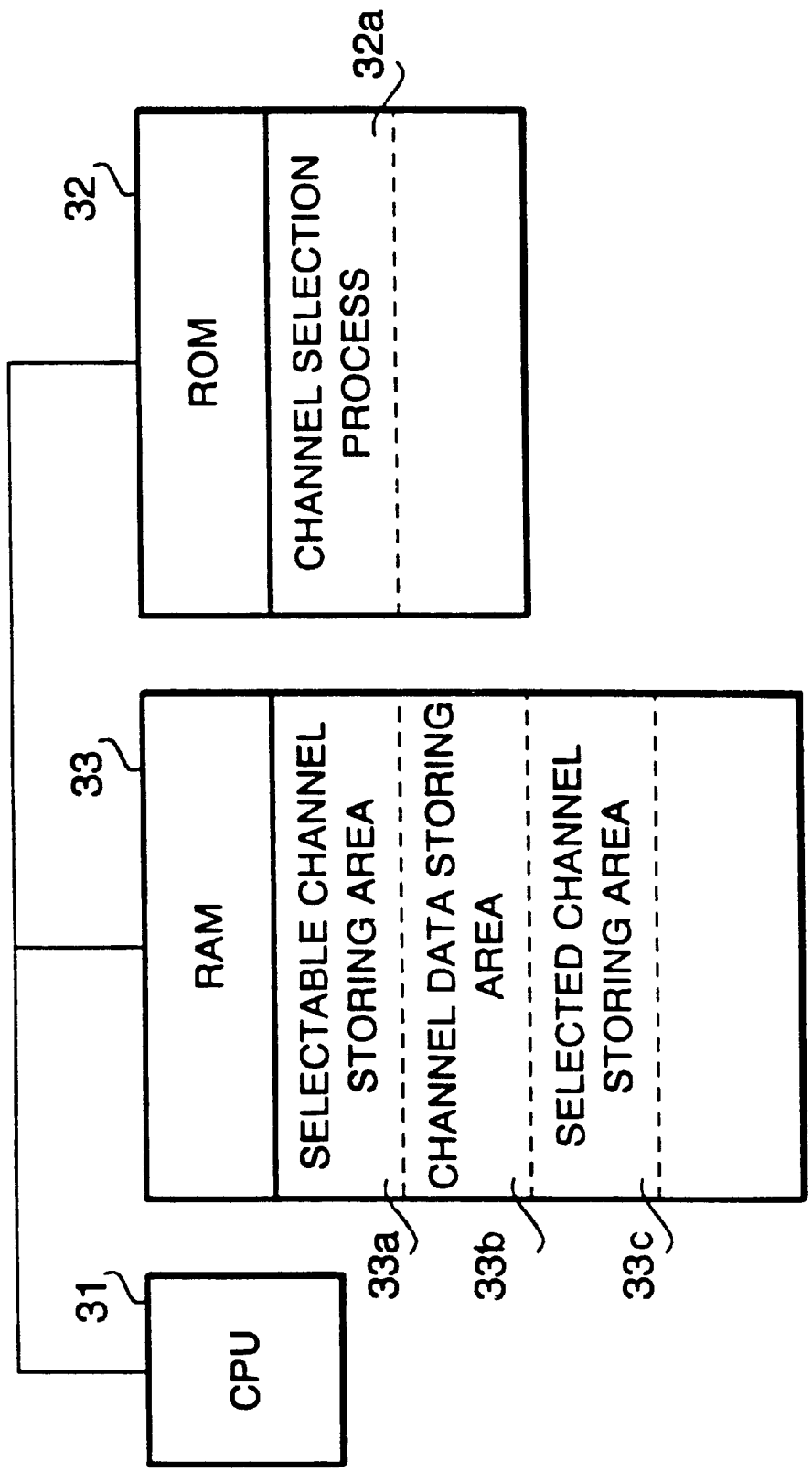
FIG. 5 shows data storing areas of a RAM and a ROM of a terminal device controller.

As shown in FIG. 5, the RAM 33 of the terminal device controller 30 includes:

(1) a selectable channel storing area 33a for storing data of which channels are selectable for the terminal device 3 (i.e., based on the particular users contract);

(2) a channel data storing area 33b for storing the channel data supplied from the broadcasting center 2; and (3) a selected channel storing area 33c for storing the currently selected channel.

The ROM 32 stores a channel switching program 32a for controlling the selection of a channel. More specifically, when the ON/OFF switch 44 is operated and the terminal device is turned ON, the channel switching program 32a controls the process of selecting the channel stored in the storing area 33c.

Figure 6:
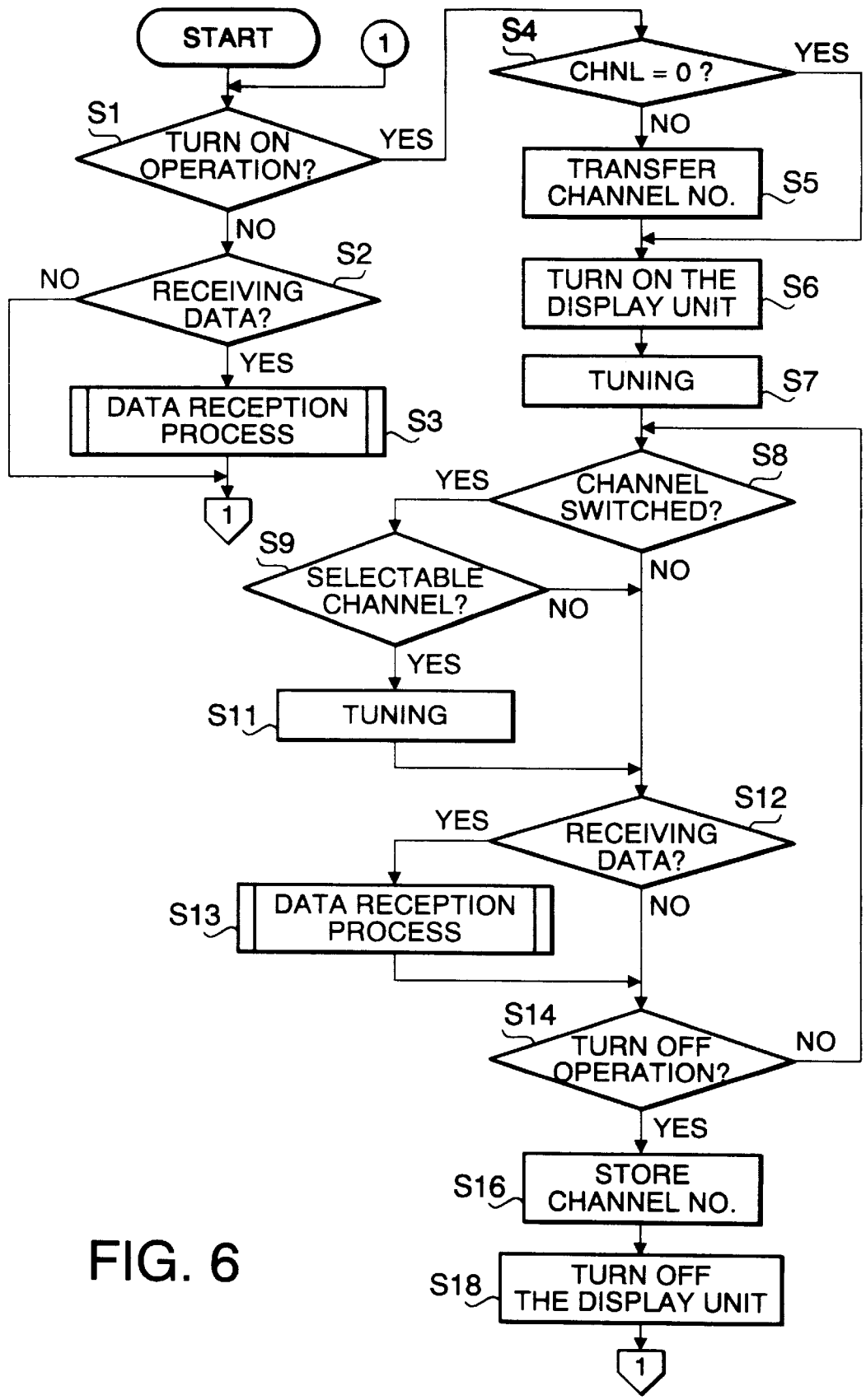
FIG. 6 is a flowchart showing a channel selection process.

FIG. 6 shows a flow chart illustrating a channel selection process executed by the terminal device controller 30.

As shown in FIG. 6, at step S1 it is determined whether or not the terminal device 3 is ON. If the terminal device is turned OFF (NO at step S1), it is determined whether there is data being received from the broadcasting center 2 at step S2. If there is no data being received (NO at step S2), the process returns to step S1. If there is data being received (YES at step S2), a data reception process is executed at step S3.

Figure 7:
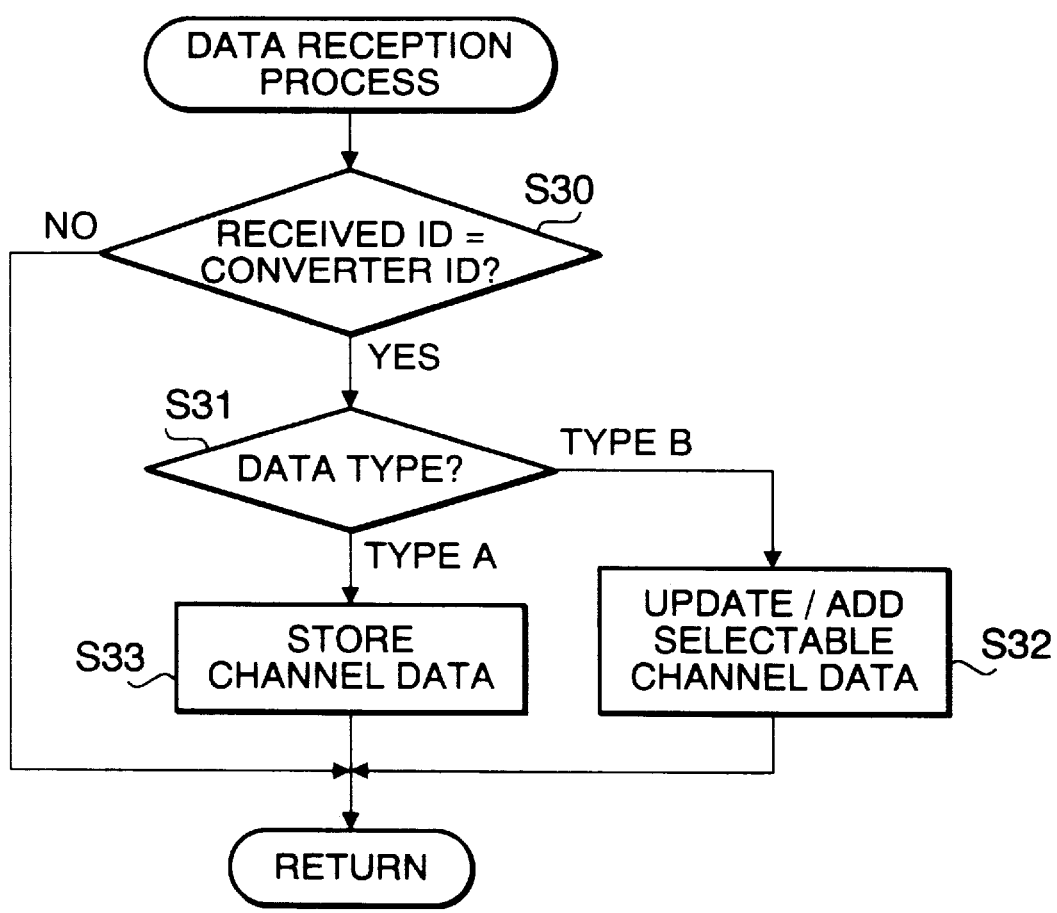
FIG. 7 is a flowchart showing a data reception process which is a subroutine called in the channel selection process.

FIG. 7 is a flowchart showing the data reception process. First, at step S30 it is determined whether the ID contained in the received data coincides with the ID assigned to the converter 29. If the two IDs do not match with each other (NO at step S30), the data reception process finishes and control returns to the main process of FIG. 6. In this case, while the data is being received, a loop from S1 to S3 is repeated, and received data is not processed in the data reception process.

If the two IDs match with each other (YES at S30), the process goes to step S31 to determine the type of the received data. If the received data is the channel data (type A at step S31), the process goes to step S33 in which the channel data (i.e., a channel number CHNL) is stored in the channel data storing area 33b (shown in FIG. 5). It should be noted that if the channel number CHNL is equal to "0", there is no notification information to be viewed by the users. Until the "0" channel data is transmitted from the broadcasting center 2, a previously stored channel number CHNL is maintained in the channel data storing area 33b. If the notification information to be viewed is that of the construction work or the like, it is preferable that the notification information is repeatedly displayed until the construction work is finished. With above control, since the channel data storing area 33b can be cleared only when the broadcasting center 2 transmits the channel data representing that the channel number CHNL equals "0", it is ensured that the notification information is viewed by the users. Then the data reception process finishes and control returns to the main process of FIG. 6.

If, at step S31, the received data is determined to be data regarding the change of selectable channels or the addition of new channels (for example, due to the renewal of or an addition to a receiving contract and the like, referred to as channel renewal data) (type B at step S31), the process goes to step S32 and updates the selectable channel data in the selectable channel storing area 33a (shown in FIG. 5) based on the channel renewal data. Then the data reception process finishes and control returns to the channel selection process shown in FIG. 6. It is possible that the broadcasting center 2 sends a command which instruct the CPU 31 of the terminal device 3 to clear the channel data storing area 33b as a type B data.

Returning to FIG. 6, after the data reception process has been executed at step S3, the process returns to step S1 and loops, as appropriate, through steps S1, S2, and S3 until the ON/OFF switch 44 is operated and the terminal device 3 is turned ON at step S1. When the terminal device 3 is turned ON (YES at step S1), the process goes to step S4 in which a channel number CHNL (i.e., the value represented by the channel data) stored in the storing area 33b (FIG. 5) is examined.

If the channel number CHNL is not 0 (NO at step S4), the process goes to step S5 and transmits the channel data (i.e., the channel number CHNL) stored in the channel data storing area 33b to the selected channel storing area 33c.

If there is no channel designating data in the channel data storing area 33b, that is, when there is no notification information, "0" is stored to the channel data storing area 33b as a channel number CHNL as described above. In this case (YES at step S4), no channel data is transmitted to the selected channel storing unit 33c, and the process goes to step S6. Accordingly, if "0" is stored in the channel data storing area 33b, the data stored in the selected channel storing area 33c is maintained (i.e., not updated).

At step S6, the display unit 34 is turned ON by the display ON/OFF circuit 38 (shown in FIG. 4), and at step S7 the tuner 42 is controlled to tune in the channel designated by the channel data stored in the selected channel storing area 33c. Thus, the display unit 34 outputs the image and sound supplied through the selected channel.

If the channel data representing the channel number CHNL other than "0" has been transmitted from the center 2, and stored in the channel data storing unit 33b, that is, the channel number CHNL is not "0" (NO at step S4), the notification channel designated thereby is selected and notification information or the like is broadcast. The notification information is continuously displayed until a user switches the channel by using the channel selection unit 43 (FIG. 4). On the other hand, if the channel number CHNL is set to "0" at step S4, the process goes to step S6 skipping step S5 such that the channel number which was last selected (i.e., when the terminal device 3 was last turned OFF) and stored in the selected channel storing area 33c is selected.

Next, the process goes to step S8 at which it is determined if the channel selection unit 43 is operated. If the channel is switched to another channel (YES at step S8), the process goes to step S9 to determine if the switched channel is one of the selectable channels stored in the selectable channel storing area 33a. If the switched channel is a selectable channel (YES at step S9), the tuner 42 is controlled to tune in the switched channel at S11. If the switched channel is not a selectable channel (NO at step S9), the switched channel is not selected (i.e., switching is invalidated) and control goes directly to step S12.

Next, at step S12, it is determined if there is data being received from the broadcasting center 2. If there is received data (YES at step S12), the process carries out the data reception process (see FIG. 7) at step S13 (the same as that described above at step S3), and then goes to step S14. If it is determined that there is no received data (NO at step S12), control goes directly from step S12 to step S14.

At step S14, it is determined if the ON/OFF switch 44 has been operated to turn the terminal device OFF. If not (NO at step S14) the process returns to step S8 and carries out the process described above. If the ON/OFF switch 44 has been operated to turn the terminal device OFF (YES at step S14), the process goes to step S16 at which a channel number which is being selected when the ON/OFF switch 44 is operated to turn OFF the terminal device 3 is stored to the selected channel storing area 33c. Then, at step S18, the terminal device 3, including the display unit 34, is turned OFF (however, power is still fed to the terminal device controller 30) and then the process returns to step S1 to carry out the similar processing.

In the first embodiment, although the notification information is continuously displayed on the monitor 51 until the channel is switched, it is also possible to automatically switch from the notification channel to the channel set when the terminal device 3 was last turned OFF after a predetermined period of time from when the notification information is first displayed. Such an arrangement will be described, with reference to FIG. 8, as a second embodiment.

Figure 8:
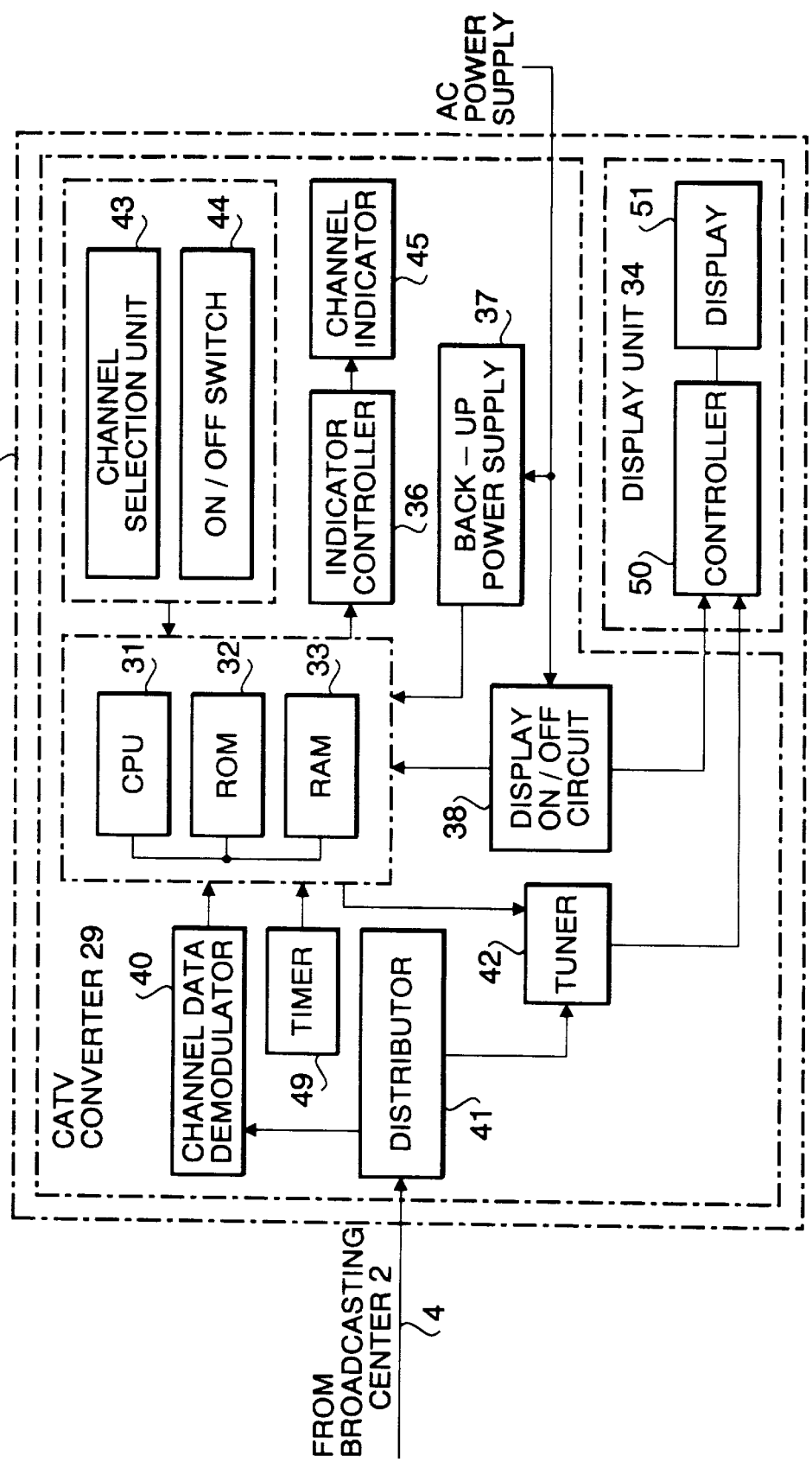
FIG. 8 is a block diagram showing the arrangement of a terminal device according to a second embodiment.

FIG. 8 is a block diagram showing a terminal device 3A according to the second embodiment. In the second embodiment, the arrangement of the terminal device 3A is similar to the first embodiment except that a timer 49 is connected to the terminal device controller 30 to measure the predetermined period of time.

In the second embodiment, when the terminal device is turned ON, firstly the channel number is selected with reference to the channel number stored in the channel data storing area 33b. At the same time, the timer 49 is started to measure the predetermined period. After the predetermined period has elapsed, the channel number stored in the selected channel storing area 33c is selected.

Figure 9:
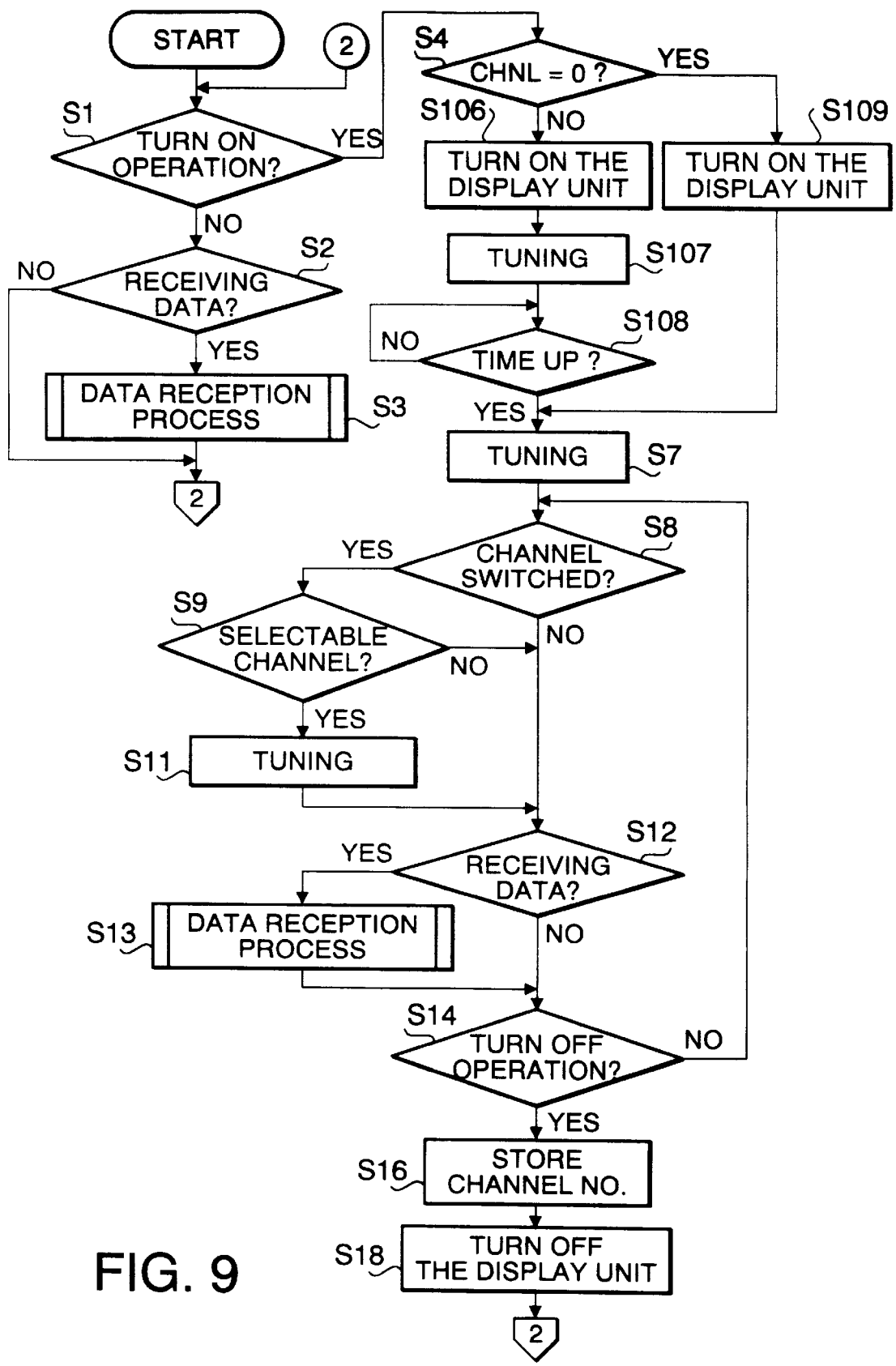
FIG. 9 is a flowchart showing a channel selection process according to a second embodiment.

FIG. 9 is a flowchart illustrating a channel selection process according to the second embodiment. In FIG. 9, steps which are the same as in FIG. 6 are given the same step numbers, and description thereof will be simplified.

According to the second embodiment, similarly to the first embodiment, if the terminal device is turned OFF, it is determined whether there is data being received from the broadcasting center 2. If there is no data being received, the process returns to step S1. If there is data being received, a data reception process is executed at step S3.

The data reception process is the same as in the first embodiment, and a description thereof is omitted.

After the data reception process has been executed at step S3, the process returns to step S1 and loops, as appropriate, through steps S1, S2, and S3 until the ON/OFF switch 44 is operated and the terminal device 3 is turned ON at step S1.

When the terminal device 3 is turned ON, a channel number CHNL (i.e., the value represented by the channel data) stored in the channel data storing area 33b (FIG. 5) is examined.

If the channel number CHNL is not "0" (NO at step S4), the process goes to step S106 where the display unit 34 is turned ON by the display ON/OFF circuit 38. Then, at step S107, the tuner 42 is controlled to tune in the channel designated by the channel data stored in the channel data storing area 33b. At the same time, the timer 49 is controlled to start measuring a predetermined period of time. At step S108, it is determined whether the predetermined period has elapsed. Until the predetermined time has not elapsed (NO at step S108), control stays at S108, that is the tuner 42 tunes in the channel designated by the channel data stored in the channel data storing area 33b. Accordingly, when control executes step S108, the display unit 34 outputs the image and sound supplied through the selected channel. When the predetermined period has elapsed (YES at step S108), the tuner 42 is controlled again to tune in the channel designated by the channel number stored in the selected channel number storing area 33c so that the previously selected channel is selected.

If "0" is stored in the channel data storing area, process goes from step S4 to step S109 where the display unit 34 is turned ON, and then process goes to step S7. Accordingly, a process of outputting the notification information which is executed at steps S107 and S108 is skipped when the channel number CHNL is "0".

Next, it is determined if the channel selection unit 43 is operated (at step S8). If the channel is switched to another channel (YES at step S8), it is determined whether the switched channel is one of the selectable channels stored in the selectable channel storing area 33a (at step S8). Only if the switched channel is a selectable channel (YES at step S9), the tuner 42 is controlled to tune in the switched channel at S11.

At step S12, it is determined if there is data being received from the broadcasting center 2. If there is received data (YES at step S12), the process carries out the data reception process (see FIG. 7) at step S13 (the same as that described above at step S3), and then the process goes to step S14.

If the ON/OFF switch 44 has not been operated to turn the terminal device OFF, the process returns to step S8. If the ON/OFF switch 44 has been operated to turn the terminal device OFF, a channel number which is being selected is stored to the selected channel storing area 33c, and then the terminal device 3 is turned OFF (however, power is still fed to the terminal device controller 30) and then the process returns to step S1 to carry out the similar processing.

Also alternatively, it is possible that when the ON/OFF switch 44 is operated to turn the terminal device OFF, the terminal device 3 automatically switches to the notification channel in order to display the notification information on the monitor 51 for a predetermined time before the terminal device 3 is turned OFF.

Figure 10:
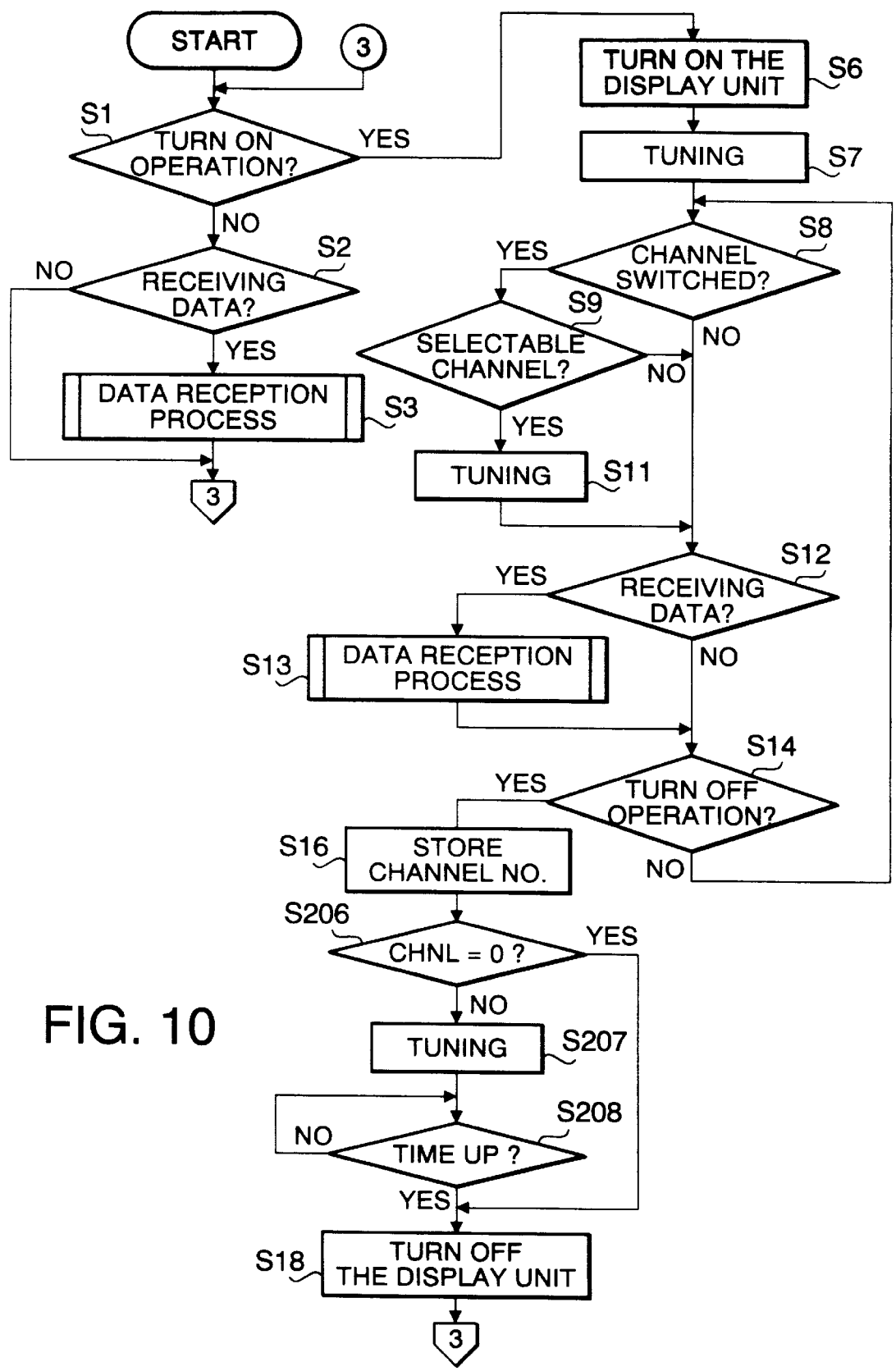
FIG. 10 is a flowchart showing a channel selection process according to a third embodiment.
Figure 11:
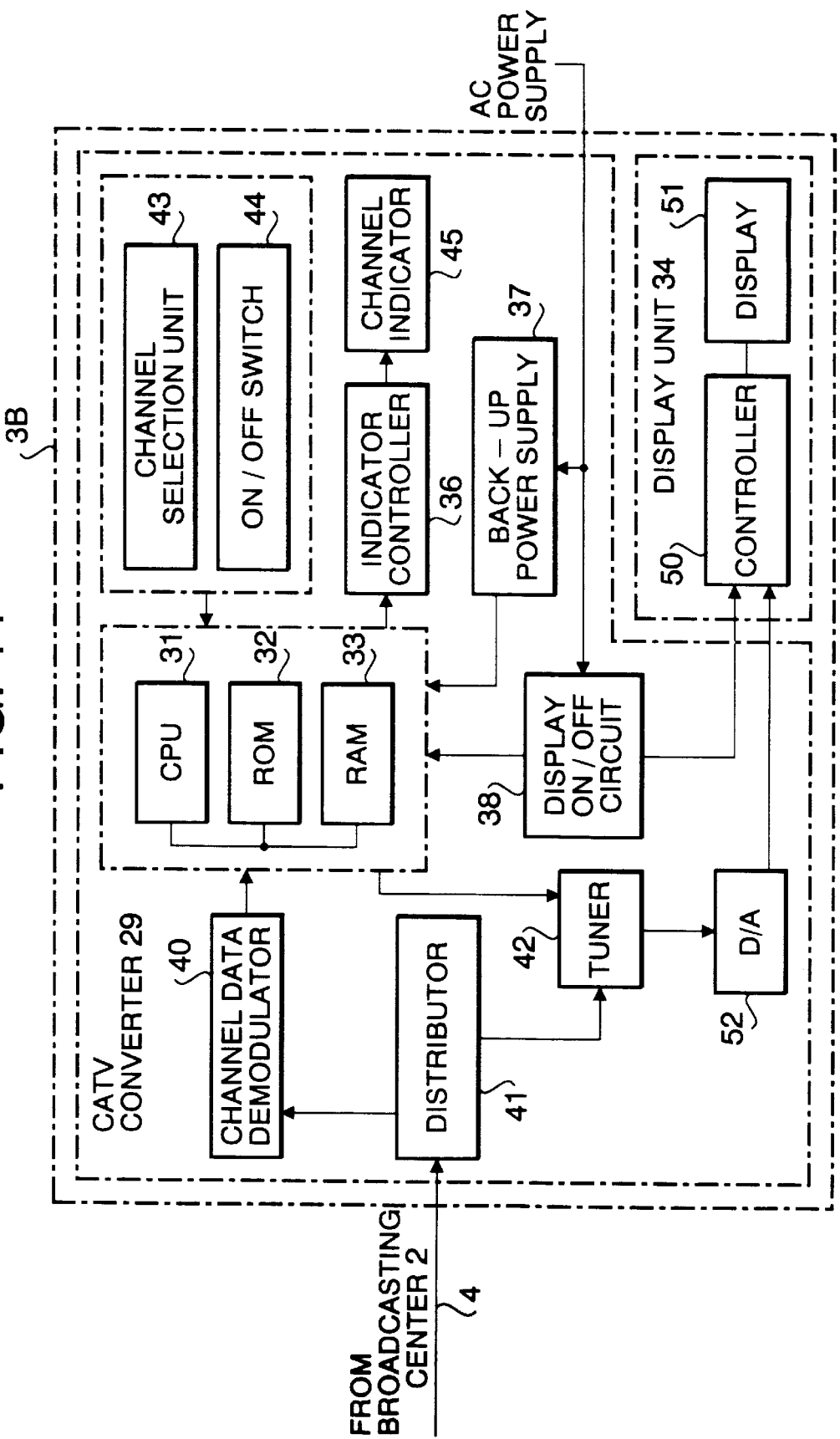
FIG. 11 is a block diagram showing the arrangement of a terminal device according to a fourth embodiment.

FIG. 10 is a flowchart illustrating an example of such a process as a third embodiment. In the flowchart in FIG. 10, the steps similar to those in FIG. 6 are give the same step numbers and description thereof is omitted or simplified.

According to the third embodiment, if the terminal device 3A is turned OFF, and there is data being received from the broadcasting center 2, the data reception process (see FIG. 7) is executed (steps S1 through S3).

After the data reception process has been executed at step S3, the process returns to step S1 and loops, as appropriate, through steps S1, S2, and S3 until the ON/OFF switch 44 is operated and the terminal device 3 is turned ON at step S1.

When the terminal device 3 is turned ON (YES at step S1), the process goes to step S6 at which the display unit 34 is turned ON, the tuner 42 is controlled to tune in the channel designated by the channel data (i.e., the previously selected channel number) stored in the selected channel storing area 33c. Thus, the display unit 34 outputs the image and sound supplied through the selected channel.

If the channel is switched to another channel (YES at step S8), and if the switched channel is a selectable channel (YES at step S9), the tuner 42 is controlled to tune in the switched channel at S11. If the switched channel is not a selectable channel (NO at step S9), the switched channel is not selected.

Next, if there is received data (YES at step S12), the process carries out the data reception process (see FIG. 7) at step S13, and then goes to step S14.

If the ON/OFF switch 44 has been operated to turn the terminal device OFF (YES at step S14), the process goes to step S16 at which a channel number which is being selected when the ON/OFF switch 44 is operated to turn OFF the terminal device 3 is stored to the selected channel storing area 33c.

Next, it is determined whether the channel number CHNL stored in the channel data storing area 33b is "0" at step S206. If the channel number CHNL is not "0" (NO at step S206), the process goes to step S207 where the tuner 42 is controlled to tune in the channel designated by the channel number CHNL stored in the channel data storing area 33b. At the same time, the timer 49 is controlled to start measuring a predetermined period of time. At step S208, it is determined whether the predetermined period has elapsed.

Until the predetermined time has not elapsed (NO at step S208), control stays at S208, that is the tuner 42 tunes in the channel designated by the channel data stored in the channel data storing area 33b. Accordingly, after the ON/OFF switch 33 is operated to turn OFF the terminal device, before the terminal device 3A is truned OFF, the display unit 34 outputs the image

What is claimed is:

1. A television system, comprising:
    a broadcasting center; and
    a plurality of terminal devices;
    said broadcast center transmitting broadcasting signals corresponding to a plurality of television channels and a channel data signal representative of a notification channel number;
    each of said terminal devices receiving said broadcasting signals and said channel data signal, each of said terminal devices including:
        a tuner;
        a first memory, in which said channel data signal is stored;
        a controller, said controller controlling said tuner to select the notification channel number represented by said channel data signal stored in said first memory at a time that said terminal device is switched from OFF to ON;
        a second memory for storing channel data representative of a selected channel number which was selected when said terminal device was last switched OFF; and
        wherein said channel data signal stored in said first memory is transferred to said second memory when said channel data signal represents a notification channel other than a predetermined notification channel and wherein said channel data signal stored in said first memory is not transferred to said second memory when said channel data signal represents said predetermined notification channel, said controller controlling said tuner to select the channel represented by said channel data stored in said second memory at the time that said terminal device is switched from OFF to ON.

2. The television system according to claim 1, wherein said first memory stores a selected channel number which was selected when said terminal device was last switched OFF;
    and wherein said controller controls said tuner to select said selected channel number stored in said first memory if said channel data signal represents a predetermined notification channel number and said controller controls said tuner to select said notification channel number if said channel data signal represents a notification channel number other than said predetermined notification channel number.

3. The television system according to claim 2, wherein said broadcasting center transmits a predetermined information through a channel represented by said channel data.

4. The television system according to claim 3, wherein said predetermined information is a notification information which is different from an ordinary broadcasting programs.

5. The television system according to claim 3, wherein said predetermined information is related to operation of said broadcasting center.

6. The television system according to claim 1, which is a cable television system, said broadcasting signals and said channel data signal being transmitted from said broadcasting center to said terminal devices through a cable network.

7. The television system according to claim 1, wherein said broadcasting signals are digital signals.

8. A television system, comprising:

a broadcasting center; and a plurality of terminal devices;

said broadcast center transmitting broadcasting signals corresponding to a plurality of television channels and a channel data signal representative of a notification channel number;

each of said terminal devices receiving said broadcasting signals and said channel data signal, each of said terminal devices including:

an operable member which is operated by a user to turn ON or OFF said terminal device;

a tuner;

a first memory, in which said channel data signal is stored; and a controller, said controller controlling said tuner to select the channel number represented by said channel data signal stored in said first memory in response to operation of said operable member;

a second memory for storing channel data representative of a selected channel number which was selected when said terminal device was last switched OFF;

wherein said channel data signal stored in said first memory is transferred to said second memory when said channel data signal represents a notification channel other than a predetermined notification channel and wherein said channel data signal stored in said first memory is not transferred to said second memory when said channel data signal represents said predetermined notification channel, said controller controlling said tuner to select the channel represented by said channel data stored in said second memory at the time that said terminal device is switched from OFF to ON.

9. The television system according to claim 8, which is a cable television system using a cable network, said broadcasting signals and said channel data signal being transmitted from said broadcasting center to said terminal devices through said cable network.

10. A terminal device for a television system, said terminal device receiving signals transmitted from a broadcasting center of said television system, said terminal device comprising:

a signal receiving system, said signal receiving system receiving signals transmitted from a broadcasting center, said signals including a channel data signal representative of a notification channel through which a predetermined information is transmitted;

a tuner;

a first memory, said first memory storing said channel data signal received by said signal receiving system; and a controller, said controller controlling said tuner to select the notification channel represented by said channel data signal stored in said first memory at a time that said terminal device is switched from OFF to ON;

a second memory for storing channel data representative of a selected channel number which was selected when said terminal device was last switched OFF;

wherein said channel data signal stored in said first memory is transferred to said second memory when said channel data signal represents a notification channel other than a predetermined notification channel and wherein said channel data signal stored in said first memory is not transferred to said second memory when said channel data signal represents said predetermined notification channel, said controller controlling said tuner to select the channel represented by said channel data stored in said second memory at the time that said terminal device is switched from OFF to ON.

11. The terminal device according to claim 10, wherein when said tuner is tuned in said notification channel represented by said channel data, said channel data is deleted.

12. The terminal device according to claim 10, wherein said television system is a cable television system.

13. A terminal device for a television system, said terminal device receiving signals transmitted from a broadcasting center of said television system, said terminal device comprising:

a signal receiving system, said signal receiving system receiving signals transmitted from a broadcasting center, said signals including a channel data signal representative of a notification channel through which a predetermined information is transmitted;

an operable member to be operated to switch ON or OFF said terminal device;

a tuner;

a first memory, said first memory storing said channel data signal received by said signal receiving system; and a controller, said controller controlling said tuner to select the notification channel represented by said channel data signal stored in said first memory in response to operation of said operable member;

a second memory for storing a selected channel number which was selected when said terminal device was last switched OFF;

wherein said channel data signal stored in said first memory is transferred to said second memory when said channel data signal represents a notification channel other than a predetermined notification channel and wherein said channel data signal stored in said first memory is not transferred to said second memory when said channel data signal represents said predetermined notification channel, said controller controlling said tuner to select the channel represented by said channel data stored in said second memory at the time that said terminal device is switched from OFF to ON.

14. The terminal device according to claim 13, wherein when said tuner is tuned in said notification channel represented by said channel data, said channel data is deleted.

15. The terminal device according to claim 13, wherein said television system is a cable television system.

16. A television system, comprising:

a broadcasting center; and a plurality of terminal devices;

said broadcast center transmitting broadcasting signals corresponding to a plurality of television channels and a channel data signal representative of a notification channel number;

each of said terminal devices receiving said broadcasting signals and said channel data signal, each of said terminal devices including:

a tuner;

a memory, said memory storing said channel data signal and a selected channel number which was selected when said terminal device was last switched OFF; and a controller, said controller controlling said tuner to tune in the notification channel number represented by said channel data signal stored in said memory for a predetermined period at a time that said terminal device is switched from OFF to ON, then tune in said selected channel number;

wherein said memory stores a selected channel number which was selected when said terminal device was last switched OFF;

and wherein said controller controls said tuner to select said selected channel number stored in said memory if said channel data signal represents a predetermined notification channel number and said controller controls said tuner to select said notification channel number if said channel data signal represents a notification channel number other than said predetermined notification channel number.

17. The television system according to claim 16, wherein each of said terminal devices further includes a timer, said predetermined period being measured by said timer.

18. A television system, comprising:

a broadcasting center; and a plurality of terminal devices;

said broadcasting center transmitting broadcasting signals corresponding to a plurality of television channels and a channel data signal representative of a notification channel number, said notification channel number corresponding to one of said plurality of television channels;

each of said terminal devices receiving said broadcasting signals and said channel data signal, each of said terminal devices including:

a tuner;

a memory, said memory storing said channel data and a selected channel number which was selected when said terminal device was last switched OFF; and a controller, said controller controlling said tuner to tune in the notification channel number represented by said channel data stored in said memory for a predetermined period at a time that an operation for switching OFF said terminal device is executed, then switch OFF said terminal device.

19. The television system according to claim 18, wherein each of said terminal devices further includes a timer, said predetermined period being measured by said timer.

20. The television system according to claim 18, wherein said memory stores a selected channel number which was selected when said terminal device was last switched OFF;

and wherein said controller controls said tuner to select said selected channel number stored in said memory if said channel data represents a predetermined notification channel number and said controller controls said tuner to select said notification channel number if said channel data represents a notification channel number other than said predetermined notification channel number.

21. A television system, comprising:

a broadcasting center; and a plurality of terminal devices, wherein said broadcast center transmits broadcasting signals corresponding to a plurality of channels, and a channel data signal;

wherein each of said plurality of terminal devices has a tuner, a channel data receiver and a controller, said controller controlling said tuner to tune in a notification channel in accordance with said channel data signal transmitted from said broadcasting center and received by said channel data receiver;

wherein each of said plurality of terminal device further comprises a memory for storing channel data signal representative of a selected channel number which was selected when said terminal device was last switched OFF; and wherein said channel data signal is transferred to said memory when said channel data signal represents a notification channel other than a predetermined notification channel and wherein said channel data signal is not transferred to said memory when said channel data signal represents said predetermined notification channel, said controller controlling said tuner to select the channel represented by said channel data signal stored in said memory at the time that said terminal device is switched from OFF to ON.

22. The television system according to claim 21, wherein each of said terminal devices further comprises a memory for storing channel data representative of a selected channel number which was selected when said terminal device was last switched OFF;

wherein said channel data is transferred to said memory when said channel data represents a notification channel other than a predetermined notification channel and wherein said channel data is not transferred to said memory when said channel data represents said predetermined notification channel, said controller controlling said tuner to select the channel represented by said channel data stored in said memory at the time that said terminal device is switched from OFF to ON.

* * * * *